July 12, 1955

A. COSEY 2,712,707

ANIMAL TRAP

Filed June 24, 1953

2 Sheets-Sheet 1

INVENTOR.
Alexander Cosey.
BY Ross & Ross
Atty & Agent

July 12, 1955

A. COSEY 2,712,707

ANIMAL TRAP

Filed June 24, 1953

2 Sheets-Sheet 2

INVENTOR.
Alexander Cosey.
BY
Ross Roe
Atty & Agent

United States Patent Office 2,712,707
Patented July 12, 1955

2,712,707

ANIMAL TRAP

Alexander Cosey, Granville, N. Y.

Application June 24, 1953, Serial No. 363,722

3 Claims. (Cl. 43—81)

This invention relates to improvements in animal traps of the type known as killer traps.

The principal object of the invention is the provision of a trap for trapping and killing such small animals as muskrats, mink and the like.

Prior art traps are constructed and arranged so that when sprung by an animal, the foot or feet are caught and in a majority of cases, the animal breaks loose leaving a foot or feet so that maimed animals are at large.

According to the novel features of the invention, the construction is such that when the trap is sprung, means operate to strike and kill the animal instantly and other means operate to prevent the unwanted opening of the trap.

The trap is efficient in its operation and is readily and easily set.

All of the above objects I accomplish by means of such structure and relative arrangements of parts thereof, as will fully appear by a perusal of the description below and by various specific features which will be hereinafter set forth.

Figure 1:
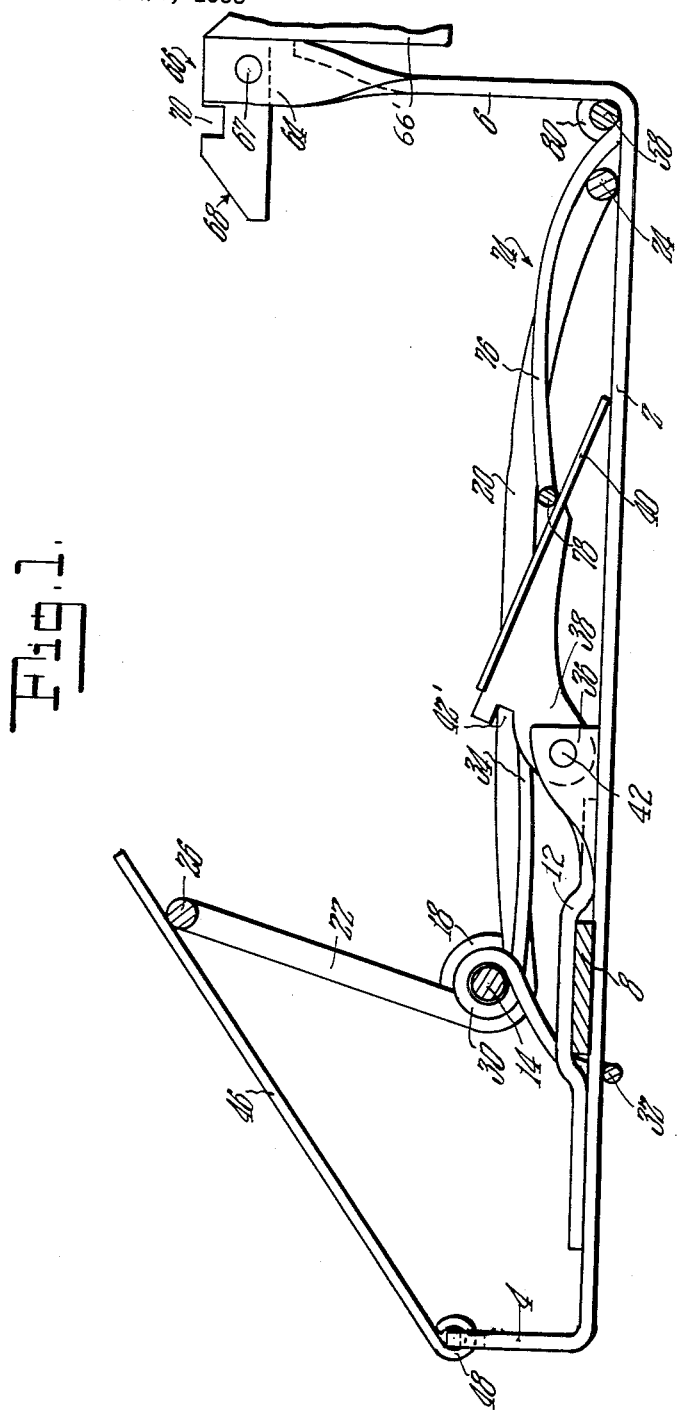
Figure 2:
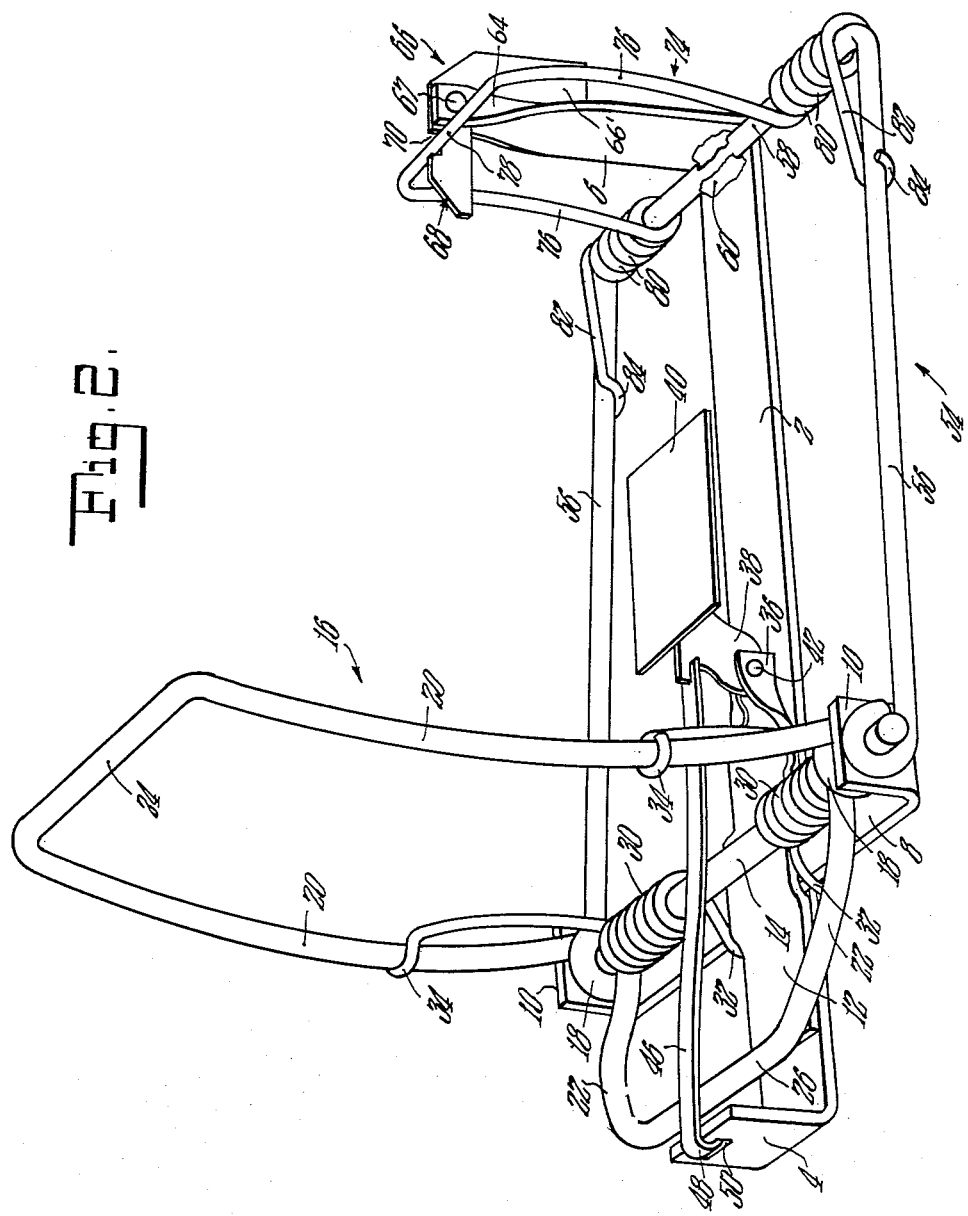

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a longitudinal sectional view through the trap shown in Fig. 2 with the components in sprung position; and Fig. 2 is a perspective view of a trap embodying the novel features of the invention and shown with the components in set position.

Referring now to the drawings more in detail, the invention will be fully described.

A support or frame is provided which includes an elongated metal strip 2 having upwardly extending rear and forward ends 4 and 6.

A transverse strut 8 is disposed adjacent the rear end of the strip 2 and has upwardly extending ears 10 at opposite ends thereof. A trigger bracket 12 overlies the strip 2 and the strut 3, and said members 2, 8 and 12 are secured together in some suitable manner as by welding or the like to provide a strong rigid supporting structure.

A transverse journal or shaft 14 is carried in the ears 10 of the strut and may take the form of a bolt or the like.

A striker 16 formed from rod-like wire has side arms which are looped at 18 around the shaft 14 and extend therefrom as forward and rear portions 20 and 22 connected by forward and rear members 24 and 26 respectively.

Springs 30 around the shaft 14 have rear ends 32 extending downwardly which are hooked beneath the supporting structure and forward ends 34 which are hooked around the side arms 20 of the striker. Said springs are adapted to forcefully swing the striker clockwise in striking direction from the set position when the trap is sprung.

The forward end of part 12 is formed to provide lugs such as 36 and a trigger comprising member 38 and trigger plate 40 has member 38 thereof disposed therebetween. Said member 38 is pivoted to the lugs at 42 and is provided with a notch 42' (see Fig. 1).

A retainer 46 in the form of an elongated strip has an eye 48 on its rear end which is in swingable engagement with the part 4 of member 2 by means of a slot 50 in said part 4.

With the striker in the set position of the trap as in Fig. 2, the transverse member 24 of the striker is in upper position and the transverse member 26 thereof is adjacent part 4 of the support. The retainer is swung over the transverse part 26 and its free end is engaged in the notch 42' of the trigger member. Thus the striker is releasably held in striking position until the trigger plate 40 is depressed. As the trigger plate is depressed, the retainer is released to free the transverse member 26 of the striker and the springs instantly swing the striker in striking direction.

A brace 54 has side arms 56 provided with eyes around shaft 14 and a transverse portion 58 which is secured to the strip 2 as by welding at 60.

The upper portion of the end part 6 of member 2 is formed to provide spaced ears such as shown at 64. A catch 66 is pivoted between said ears and its outer end is provided with a weight 66'. The upper rear edge of the catch is provided with an inclined face 68 and the upper side thereof is provided with a notch 70.

A hold-down 74 is formed from spring wire material and has side arms 76 connected by a transverse portion 78. Convolutions 80 of the member 74 are disposed on transverse portion 58 of the brace and opposite end portions 82 of the hold-down are hooked around the side arms 56 of the brace as at 84.

In the set position of the trap, the transverse portion 78 of the hold-down is engaged in the notch 70 of the catch 66. The arrangement is such that when the catch is swung counterclockwise, the hold-down is released so by the spring action it swings counterclockwise.

In use the trap is set for springing as shown in Fig. 2 where the animals to be trapped are likely to run.

An animal passing over the trap strikes the trigger plate so as to swing it clockwise. The retainer is released from the trigger plate and the springs acting on the striker swing it clockwise so that the transverse portion and side arms strike the animal with killing force.

In swinging clockwise, the transverse member 24 of the striker hits the face 68 of the catch to swing it counterclockwise. This releases the transverse part 78 of the hold-down so that by the spring action it quickly swings counterclockwise.

In the sprung position of the trap, the striker overlies the animal and the side arms 76 of the hold-down overlie the transverse part 24 of the striker thereby to prevent the striker being raised by the animal therebeneath.

The invention may be embodied in other specific forms without departing from the essential characteristics thereof. Hence, the present embodiment is to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A killer trap comprising in combination, a support, a striker, pivotal connections between one end of said support and said striker for swinging of the latter towards the other end of the support in a striking direction, a retainer, pivotal connections between said support and retainer for swinging of the latter between a set position in retaining engagement with the striker in its set position and in a striker releasing position, a trigger and pivotal connections between said support and trigger for swinging of the latter between set and sprung positions, engageable means carried by said trigger and retainer for releasably holding the retainer in set position of the trigger, means to propel said striker from set to striking position, a hold-down and pivotal connections between said support and hold-down for swinging of the latter from set position towards said one end of the support and adapted to overlie said striker in sprung position thereof, a catch pivoted to said other end of the support having means to releasably receive the hold-down in set position thereof, and means propelling said hold-down from set position to a position overlying said striker, said catch having an inclined position disposed to be engaged and swung to releasing position by said striker in swinging thereof from set position whereby said hold-down is released.

2. A trap set forth in claim 1 wherein an elongated member is secured to said support, and said hold-down has spaced side arms provided with turns thereof swingable on said elongated member.

3. A killer trap comprising in combination, an elongated support having rear and forward ends, a striker and pivotal connections between said striker and rear portion of said support for swinging of said striker from set position forwardly towards the forward end of said support to striking position, said striker having a rear portion arranged to extend rearwardly of said pivotal connections in set position of said striker, an elongated retainer and pivotal connections between a rear end of said retainer and rear end of said support for swinging of the retainer from retaining to releasing position, said retainer having a free end and arranged in retaining position thereof to extend forwardly and over said rear portion of the striker in set position thereof, a trigger and pivotal connections between said trigger and support disposed forwardly of the first-named pivotal connections for swinging of the trigger from set position to retainer releasing position, said trigger having a notch to releasably engage the free end of said retainer in set position thereof, a hold-down and pivotal connections between said hold-down and forward end of said support for swinging of said hold-down rearwardly from set position to sprung position and arranged to overlie said striker in its sprung position, a catch and pivotal connections between said catch and forward end of said support for swinging of said catch from set to releasing position, said catch provided with means to engage and releasably hold said hold-down in set position thereof, said catch provided with an inclined face for engagement by said striker in swinging thereof from set position whereby said catch is swung to release said hold-down, means biasing said striker from set to swung positions, and means biasing said hold-down to sprung position.

References Cited in the file of this patent

UNITED STATES PATENTS

| | | |
|---|---|---|
| 1,089,975 | Shaw | Mar. 10, 1914 |
| 1,434,505 | Schmidt | Nov. 7, 1922 |
| 1,455,106 | Butler | May 15, 1923 |
| 1,537,038 | Dorakdjain | May 5, 1925 |

FOREIGN PATENTS

| | | |
|---|---|---|
| 10,247 | Great Britain | 1908 |
| 537,261 | Germany | Oct. 31, 1931 |